No. 895,965. PATENTED AUG. 11, 1908.
R. C. CLINKER.
REGULATION OF DYNAMO ELECTRIC MACHINES.
APPLICATION FILED SEPT. 28, 1905.
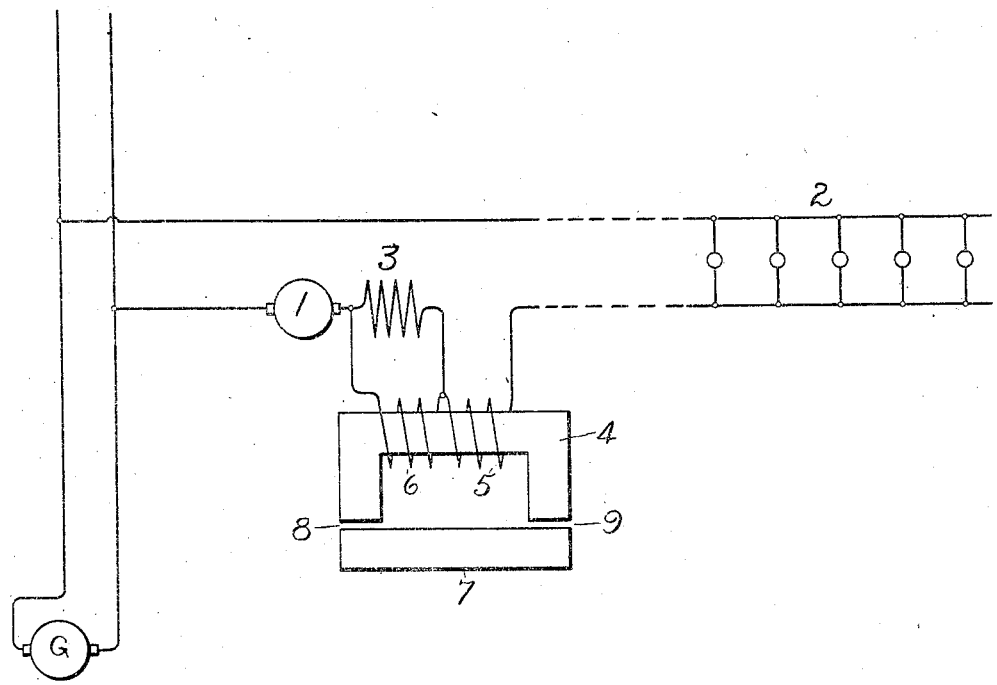
WITNESSES:
Lester H. Fulmer.
J. Ellis Glen.
INVENTOR
REGINALD C. CLINKER.
BY
ATT'Y.

UNITED STATES PATENT OFFICE.

REGINALD C. CLINKER, OF RUGBY, ENGLAND, ASSIGNOR TO GENERAL ELECTRIC COMPANY, A CORPORATION OF NEW YORK.

REGULATION OF DYNAMO-ELECTRIC MACHINES.

No. 895,965.      Specification of Letters Patent.      Patented Aug. 11, 1908.

Application filed September 28, 1905. Serial No. 280,499.

*To all whom it may concern:*

Be it known that I, REGINALD C. CLINKER, a subject of the King of Great Britain, residing at Rugby, county of Warwick, England, have invented certain new and useful Improvements in Regulation of Dynamo-Electric Machines, of which the following is a specification.

This invention relates to dynamo electric machines having a winding on the field magnet in series with the armature, and is particularly applicable to that class of machines known as series boosters or regulators, employed for regulating the potential on electric distribution systems. As usually arranged, such machines have a field winding of low resistance which is placed in series with the armature, the whole being inserted into the circuit the pressure of which is to be controlled, so that when an increase of the current flowing in the circuit takes place the strength of the magnetic field flux is increased, thereby proportionally increasing the voltage added to the circuit by the revolving armature, and conversely when the current diminishes the voltage supplied by the booster is correspondingly diminished. Such machines, however, are sluggish in action, because a sudden change of field current cannot produce an instantaneous change of flux owing to the generation of opposing eddy currents in the mass of metal forming the magnetic circuit.

The object of this invention is to reduce this sluggishness and to cause the flux of the machine to respond more quickly to a change of current. It is particularly applicable to the case where a shunt of low resistance is required in parallel with the field winding.

The features of novelty which characterize the invention are set forth with particularity in the appended claims. The invention itself, however, will be better understood by reference to the following description taken in connection with the accompanying drawings which represent diagrammatically one of the various forms which the invention may assume in practice.

In the drawing the invention is represented as applied to a booster having an armature 1 connected in series with a feeder 2 or other conductor of a system in which it is desired to insert the booster voltage. The field winding is indicated at 3 and is connected in series with the armature as indicated. In order to make the magnetic flux due to current in the winding 3 more quickly responsive to variations of current in the main circuit, I provide a transformer 4 having two windings thereon 5 and 6, the first of which is connected in series with the booster circuit and the second, namely the winding 6, in shunt to the booster field winding 3. A bridge piece 7 completes the magnetic circuit of the transformer except for the small air gaps 8 and 9 which cause the core readily to lose its magnetism when the magnetizing force is removed.

The core of the transformer is so constructed that the magnetic flux therein varies instantly with the variations of current in the winding 5, while the field-magnet 3 of the booster is necessarily so constructed that when the current in the winding 3 varies, the corresponding variation in magnetic flux lags behind the variation in current. If the current flowing through the circuit should suddenly increase, the increased current would divide between the field winding 3 and the transformer winding 6, which are connected in parallel; but all the increase of current would necessarily flow through the winding 5 of the transformer. An electromotive force would be instantly induced in the winding 6, which would be proportional in amount to the rate of increase of the current in the circuit, and would be in such a direction as to augment the effect of the current flowing through the winding 3. The result would be a sudden and great increase of current flowing through the winding 3, and a corresponding quickening and strengthening of the field of the booster. As soon as the current becomes steady, the induced electromotive force in the winding 6 dies away, and the strength of the field of the booster is then due only to the steady flow of current through the winding 3. Similarly a decrease of current in the main circuit causes a transient opposing current to flow from the secondary 6 to the field winding which opposing current assists in reducing the magnetic flux of the machine. When the main current is steady the secondary circuit 6 acts as a simple shunt about the field winding 3, and the compounding of the machine may be varied if desired by varying the resistance of this circuit.

While I have shown my invention applied to a series booster, it will be understood that it is equally applicable to any direct-current dynamo-electric machine having a winding on the field magnet in series with the armature.

What I claim as new and desire to secure by Letters Patent of the United States, is:

1. The combination with a winding connected in series with an electrical circuit, of a shunt for said winding, and means for varying the effect of said shunt in proportion to the rate of change of the load upon said circuit.

2. In an electrical device, the combination with a source of current, of a winding connected in series therewith, and means connected in shunt to said winding for varying the voltage at the terminals of the winding in proportion to the rate of change of the current.

3. The combination of a winding connected in series with a circuit, of a connection in shunt to said winding, and means for generating in said connection an electromotive force proportional to the rate of change in load on said circuit.

4. The combination with a dynamo-electric machine having a winding on its field magnet connected in series with its armature, of means for momentarily augmenting changes of voltage at the terminals of said winding due to changes in the load on the armature circuit proportionately to the rate of change of the load.

5. The combination with a dynamo-electric machine having a winding on its field magnet connected in series with its armature, of a magnetic core having two windings thereon, one in shunt to said field winding and the other in series with the armature circuit.

6. The combination with a dynamo-electric machine having a field winding in series with the external circuit, of a transformer having one winding responsive to variations in the load and a second winding connected in shunt to said field winding, said transformer generating in said second winding an electromotive force proportional to the rate of change of load on the external circuit.

7. The combination with a dynamo-electric machine having a winding on its field magnet connected in series with its armature, of a magnetic core with an air-gap in its magnetic circuit and two windings thereon, one in shunt to said field winding and the other in series with the armature circuit.

8. The combination of a dynamo-electric machine having a series field winding, and a transformer having two windings, one connected in series with the machine, and the other in shunt to said field winding In witness whereof, I have hereunto set my hand this eighth day of September, 1905.

REGINALD C. CLINKER.

Witnesses:
E. M. WEBB,
MARSHAL HALSTEAD.